United States Patent [19]

Kamimura et al.

[11] Patent Number: 4,542,479

[45] Date of Patent: Sep. 17, 1985

[54] DISTRIBUTED CONTROL SYSTEM

[75] Inventors: Hiroshi Kamimura; Tetsuo Ito, both of Hitachi, Japan

[73] Assignee: Hitachi, Ltd., Tokyo, Japan

[21] Appl. No.: 368,046

[22] Filed: Apr. 14, 1982

[30] Foreign Application Priority Data

Apr. 20, 1981 [JP] Japan .................................. 56-58498

[51] Int. Cl.[4] .................................................. G06F 9/00

[52] U.S. Cl. ...................................... 364/900; 364/184

[58] Field of Search ... 364/900 MS File, 200 MS File, 364/137, 119

[56] References Cited

U.S. PATENT DOCUMENTS

| | | | |
|---|---|---|---|
| 4,141,066 | 2/1979 | Keiler | 364/200 |
| 4,347,563 | 8/1982 | Paredes et al. | 364/133 |
| 4,388,686 | 6/1983 | Haid | 364/200 |
| 4,417,303 | 11/1983 | Korowitz et al. | 364/200 |

*Primary Examiner*—Gareth D. Shaw
*Assistant Examiner*—John G. Mills
*Attorney, Agent, or Firm*—Antonelli, Terry & Wands

[57] ABSTRACT

A distributed control system wherein a plurality of controlled objects are normally controlled by independent controllers, respectively, and each of the controllers has a monitoring function to monitor status of at least one of other controllers and a backup control function to control the controlled object normally controlled by the one controller when the one controller becomes out of order is arranged such that a main transmission path is provided which has sections respectively corresponding to the controllers and the signal transmission necessary for normal control of the controlled object associated with each controller, monitoring of status of at least one of other controllers and backup control of the one controller is effected by using the section of the main transmission path corresponding to the one controller.

5 Claims, 7 Drawing Figures

DISTRIBUTED CONTROL SYSTEM

BACKGROUND OF THE INVENTION

1. Field of the Invention

This invention relates to a distributed control system wherein controlled objects provided in a plant are divided into a plurality of groups and each group is controlled by an independent controller.

2. Description of the Prior Art

In recent years, a distributed control system has come into wide use for plant control, the system being such that controlled objects provided in a plant are divided into a plurality of groups and an independent controller is provided for each group so that failure in the controller for one group will not affect the controller for another group. Also, availability of microprocessors at low cost has put into practice a more advanced distributed control system in which each of the controlled objects in one group is controlled separately from other controlled objects in the group by an individual closed-loop controller.

Typically, in such a distributed control system, the controllers are connected to a central processing unit through separate transmission paths and are centrally controlled by the central processing unit. In this system, in the event of failure of one controller, an object or a group of objects which have been controlled by the faulty controller are in a condition where they are without control, and in the extreme case, the plant as a whole may be affected adversely. To prevent such inconvenience, there has been proposed a system as disclosed in Japanese patent application No. 21273/77 entitled "Backup Control System" and filed on Feb. 28, 1977 in the name of Hokushin Denki Seisakusho, which application was laid open to the public on Sept. 16, 1978, under KOKOKU No. 106534/78. According to this proposal, each controller is connected not only to one object to be normally controlled by that controller through a transmission path but also to another object to be normally controlled by another controller through another transmission path in order to back up the latter controller, and in the event of failure of the backed up or guest controller, the host controller plays the part of the guest controller in controlling the other object associated therewith. In such a system, however, an additional transmission path must be provided between each controller and the other controlled object to be backed up thereby and when it is desired that each controller backs up a plurality of other controlled objects, the provision of a plurality of transmission paths is required between each controller and the other controlled objects to be backed up. This leads to a complicated system, and also involves the problem that each controller can back up only the controlled objects connected thereto through the additional transmission paths. It should be appreciated that the term "controlled object" used in this specification and the appended claims represents either one controlled object or one group of controlled objects to be controlled by one controller.

SUMMARY OF THE INVENTION

An object of this invention is to provide a distributed control system wherein each of a plurality of controllers normally controls one controlled object and monitors the status of at least one of the other controllers which normally controls another controlled object so that in the event of failure of the other controller, the particular controller plays the part of the faulty controller in controlling the other controlled object, and the signal transmission necessary for monitoring of the other controller and backup control of the other controlled object is effected through the signal transmission path used for the normal control.

According to this invention, each controller performs signal transmission for acquiring necessary information from the other controller monitored thereby and signal transmission for acquiring information from its own managing controlled object both through a common transmission path. Accordingly, any controller can acquire the information from the associated other controller monitored thereby in the same fashion as it acquires the information from its direct controlled object which is normally controlled by that controller, and any of the controllers can be monitored by another one of the controllers without the provision of additional transmission paths.

DESCRIPTION OF THE PREFERRED EMBODIMENTS

Figure 1:
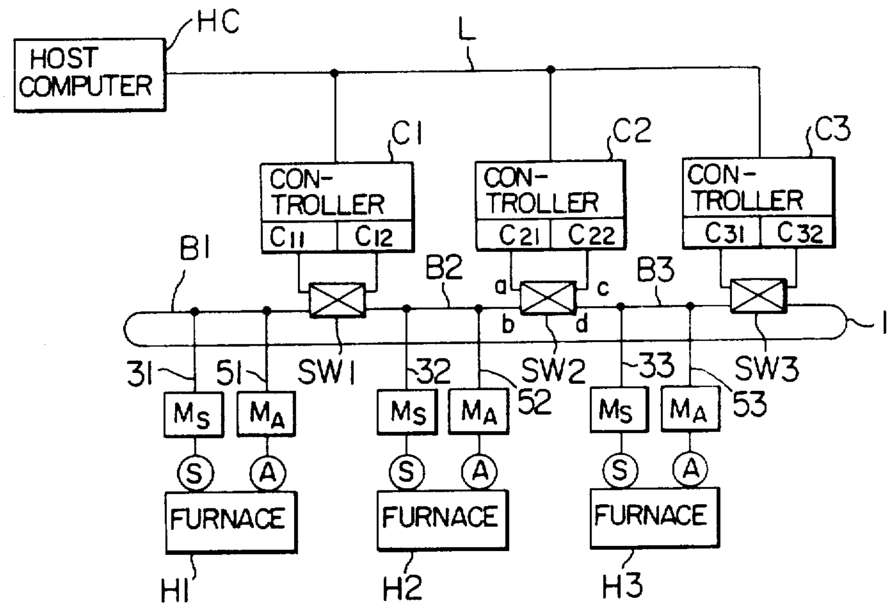
FIG. 1 is a block diagram showing a circuit arrangement of a distributed control system embodying the invention.

In a preferred embodiment of the invention as shown in FIG. 1, three controlled objects $H_1$, $H_2$ and $H_3$, which may be furnaces provided in a plant, are controlled by controllers $C_1$, $C_2$ and $C_3$, respectively. A main transmission path 1 is provided for signal transmission between the controllers and the furnaces. The main transmission path has three sections $B_1$, $B_2$ and $B_3$ respectively corresponding to the controllers $C_1$, $C_2$ and $C_3$. Each of the furnaces is equipped with a sensor S for detection of its operating state, for example, a temperature sensor for detecting temperatures in the furnace and an actuator A to control furnace temperature by a control command fed from a controller associated with the furnace according to the output of the sensor S. The actuator may be an electromagnetic valve for adjustment of the supply of fuel. The sensor S and actuator A are connected, through signal transmission modules $M_S$ and $M_A$ and sub-transmission paths 31 and 51, 32 and 52 or 33 and 53 to one section of the main transmission path corresponding to the controller for controlling the associated furnace. The transmission module $M_S$ provided for the sensor S is responsive to a predetermined signal to transmit a signal representative of a value detected by the sensor S and the transmission module $M_A$ provided for the actuator A, on the other hand, is responsive to a control signal directed to the associated furnace so as to supply a necessary operation signal to the actuator A. As desired, the module $M_A$ may have a transmission function to transmit a signal for controlling the associated furnace. These transmission modules are known and will not be detailed herein.

Figure 2:
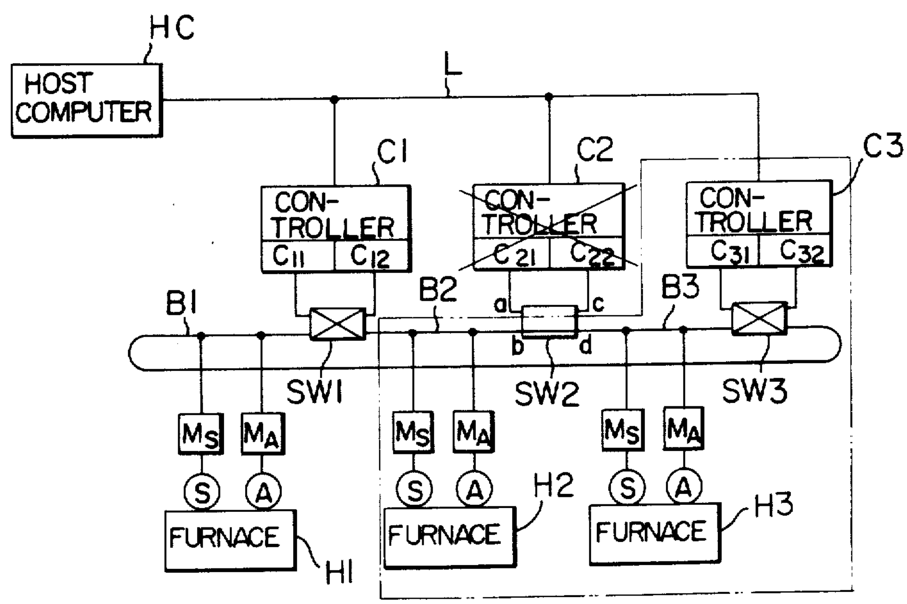
FIG. 2 is a block diagram useful in explaining the operation in the event of failure of one controller in the FIG. 1 embodiment.

Each controller is equipped with two transmitter/receivers and is connected to the main transmission path through a switching unit. By making reference to the controller $C_2$ as a typical example, this controller is equipped with transmitter/receivers $C_{21}$ and $C_{22}$. When the controller $C_2$ operates normally, an associated switching unit $SW_2$ is in an ON mode as shown in FIG. 1 to connect the section $B_2$ of the main transmission path to the transmitter/receiver $C_{22}$ and the section $B_3$ to the transmitter/receiver $C_{21}$. On the other hand, in the event of failure of this controller, the switching unit $SW_2$ switches to a bypass mode as shown in FIG. 2 in which the sections $B_2$ and $B_3$ are disconnected from the transmitter/receivers $C_{22}$ and $C_{21}$ and are directly connected to each other. The manner of controlling the switching between the two modes will be described later. Each of the controllers $C_1$, $C_2$ and $C_3$ may itself participate in controlling the associated controlled object, but alternatively, when performing sophisticated control operations, each controller may be connected to a host computer HC so as to be cooperative therewith for effecting such controlling operations.

Figure 3:
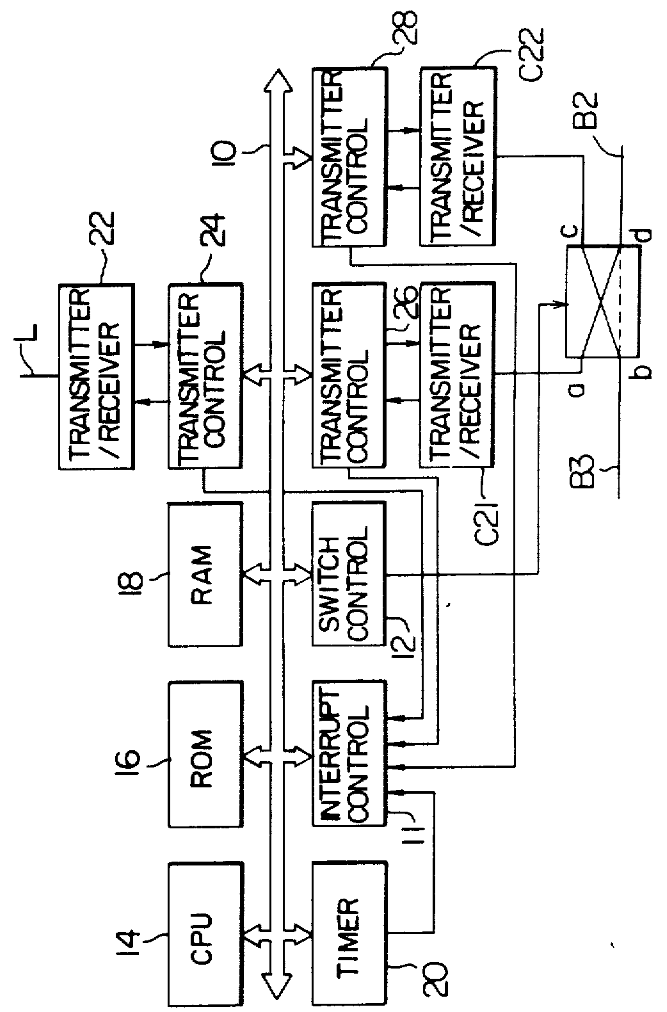
FIG. 3 is a block diagram showing a construction of each controller.

Basically, each controller has a normal control function to control a particular controlled object which is normally under its control, a monitoring function to monitor at least one of the other controlled objects which is normally controlled by a different controller, and a backup function to control the one other controlled object in the event of failure of the controller assigned to that object. These functions are executed in accordance with a program of a central processing unit (CPU) 14 provided in the controller as shown in FIG. 3.

Normal Control Function

An information request signal for an associated controlled object stored in a ROM 16 is transmitted through a transmitter control 28 to the transmitter/receiver $C_{22}$. This information request signal is fed to the section $B_2$ of the main transmission path through the switching unit $SW_2$ now being in the ON mode and received by the module $M_s$ associated with the controlled object $H_2$. This module $M_s$ then sends a detection signal representative of a value now detected by the sensor S, which signal is applied on the path to the transmitter/receiver $C_{22}$. In the controller, the detection signal is stored in a RAM 18 and the CPU 14 calculates a controlling value according to the detection signal. As desired, the necessary data may be fed through a transmitter control 24 and a transmitter/receiver 22 to the host computer HC for calculation of a controlling value. The calculated controlling value in the form of a control signal is sent via the transmitter control 28, transmitter/receiver $C_{22}$ and transmission path section $B_2$ to the module $M_A$ associated with the controlled object $H_2$, and the actuator A is operated in accordance with the controlling value.

Monitoring Function

A predetermined response request signal stored in the ROM 16 of a particular controller (hereinafter referred to as a host controller) is sent via the transmitter controller 28, transmitter/receiver $C_{22}$ and transmission path section $B_2$ to a controller (hereinafter referred to as a guest controller) which is monitored by the host controller. For monitoring two or more guest controllers, addresses of the receiving controllers may be contained in the response request signal. In the transmission path connection as shown in FIG. 1, the controller $C_2$ monitoring the controller $C_1$ represents the host controller and the controller $C_1$ represents the guest controller, for example. When the switching unit associated with the guest controller $C_1$ is in the ON mode, the response request signal is received by a transmitter/receiver $C_{11}$. In response to this response request signal, the guest controller $C_1$ causes a detection value signal for the controlled object $H_1$ stored in its RAM 18 to be sent to the transmission path section $B_2$ via transmitter control 26 and transmitter/receiver $C_{11}$, and the host controller $C_2$ receives, at the transmitter/receiver $C_{22}$, the detection value signal and stores it in a predetermined location of its RAM 18. In this manner, the host controller $C_2$ in the above case sends the response request signal to the guest controller during each monitoring cycle, and receives updated information regarding the controlled object $H_1$ associated with the guest controller $C_1$ for storage in the RAM 18. Thus, the host controller $C_2$ is now ready for controlling the controlled object $H_1$ in the event of failure of the controller $C_1$. It should be appreciated that when the host controller $C_2$ receives a reply indicative of information regarding the controlled object $H_1$ from the guest controller $C_1$, it judges that the guest controller $C_1$ is in normal status. Similarly, with the controller $C_3$ being a host controller, the controller $C_2$ may represent a guest controller to be monitored by the controller $C_3$.

Backup Control Function

The switching unit associated with each controller switches the connection relationship between the associated transmission path sections in the event of failure of the associated controller. For example, if the controller $C_2$ becomes out of order, the associated switching unit $SW_2$ switches to the bypass mode. The switching operation will be described later. The controller $C_2$ normally controls the controlled object $H_2$ and at the same time, its status is monitored by the controller $C_3$ in a fashion as described previously. However, when the controller $C_2$ becomes out of order and the associated switching unit switches to the bypass mode, the response request signal sent from a transmitter/receiver $C_{32}$ of host controller $C_3$ to the guest controller $C_2$ cannot reach the guest controller $C_2$ and the host controller $C_3$ can receive no reply from the guest controller $C_2$. In the absence of the reply from the guest controller $C_2$, the host controller $C_3$ judges that the guest controller $C_2$ is out of order and controls the controlled object $H_2$ by using an updated detection value of the controlled object $H_2$ which has been sent from the guest controller $C_2$ and stored in its RAM 18 in advance of the occurrence of the failure. The control program for the controlled object $H_2$ has previously been stored in the RAM 18 of the controller $C_3$ as will be described later.

With the controller $C_2$ being out of order, the controller $C_3$ monitors the controller $C_1$ in the same manner as in the monitoring of the controller $C_2$. When the controller $C_1$ also becomes faulty, the response request signal sent from the controller $C_3$ returns to the controller $C_1$, and the controller $C_3$ detects failure of the controller $C_1$ and performs backup control for the controller $C_1$.

Switching Operation of Switching Unit

A switch control 12 is provided for each of the controllers and under normal status of the controller, it generates, at a predetermined constant time interval, pulses which in turn are applied to the switching unit. The switching unit takes the form of a so-called watchdog timer and it responds to each pulse to hold the ON mode for a time slightly longer than the predetermined constant time interval. But, when the switching unit does not receive another pulse after lapse of the predetermined constant time interval, it is switched to the bypass mode.

Figure 4:
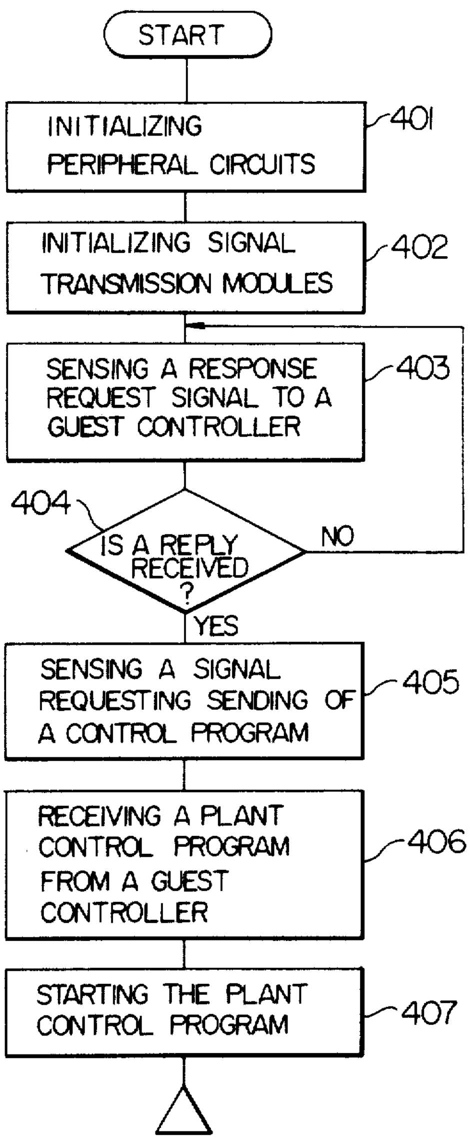
FIGS. 4 and 5 illustrate flow charts of operation programs for each controller.
Figure 5:
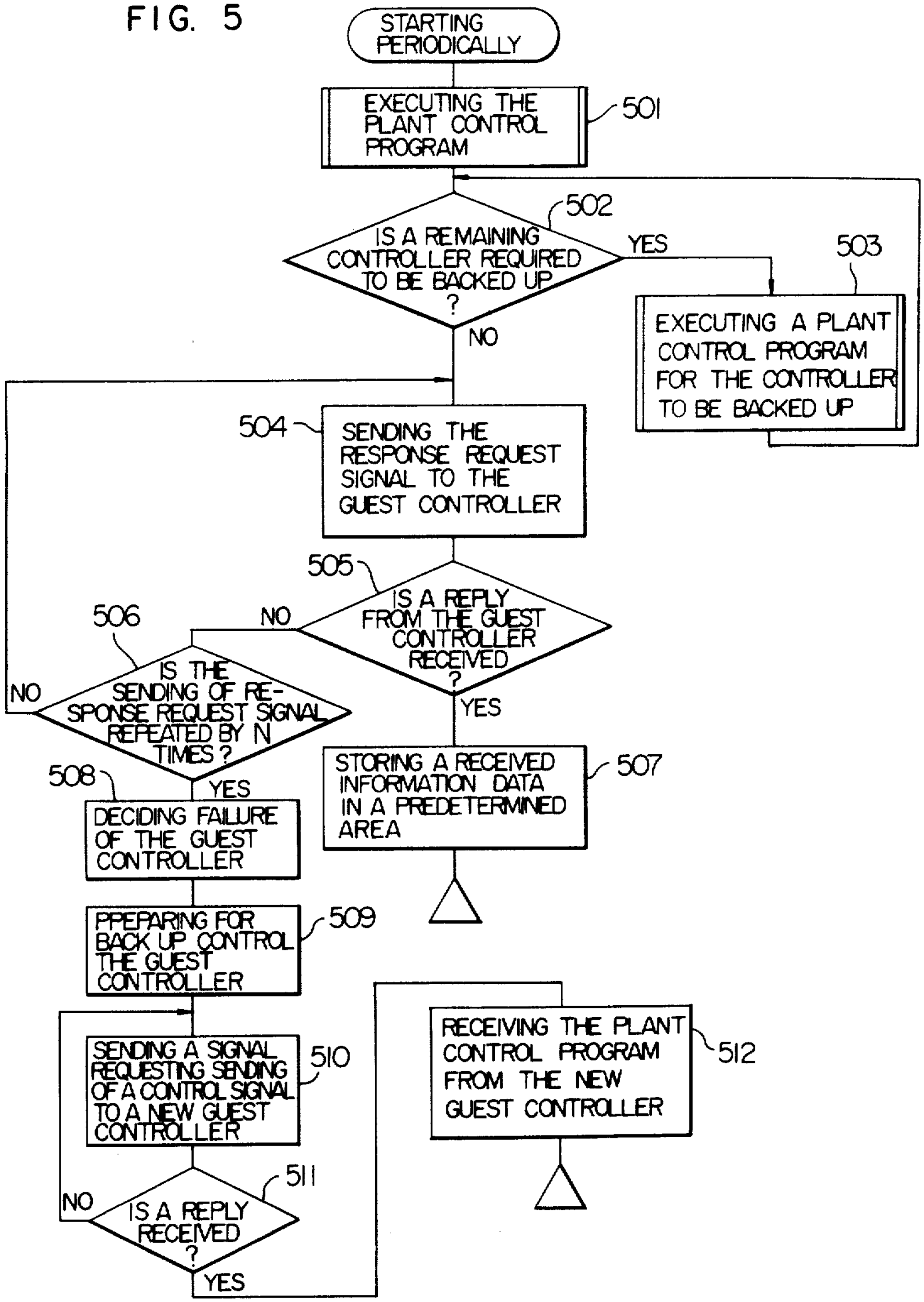

The normal control operation, monitoring operation and backup control operation of each controller are executed in accordance with a program of the CPU 14. FIGS. 4 and 5 show flow charts of the program. Especially, FIG. 4 shows a flow chart of a program for initialization when a plant starts operating and in step 401, the timer 20, switch control 12 and the transmitter controls 26 and 28 are initialized. In step 402, the modules associated with the controlled objects are initialized. Thereafter, in step 403, the response request signal is sent from the host controller to the guest controller. The sending is repeated a predetermined number of times if no reply to the request signal is received. Then, if no reply has been received, it is judged that the guest controller or the controlled object is abnormal and hence requires repair and the operation of the system is restrained. When the reception of the reply from the guest controller is confirmed in step 404, the processing proceeds to step 405 in which the host controller sends to the guest controller a signal for requesting the guest controller to send a control program for the controlled object associated with the guest controller and stored in the ROM 16 thereof. In step 406, the host controller stores the control program sent from the guest controller in its own RAM 18 and it is now ready for backup control to be effected in the event of failure of the guest controller. Then, the processing proceeds to step 407 in which a flag is set which represents completion of preparation for starting the plant controlling program.

FIG. 5 specifically illustrates a flow chart of the operation program for each controller. As shown, the start timing is determined by the timer 20 and a periodic interruption signal from an interruption control 11 to confirm that the flag representative of the completion of preparation for the plant controlling program is set. Thereafter, execution of the program is started. In step 501, the controller executes the control program for the controlled object which is normally controlled by that controller. After completion of the execution, it is judged in step 502 whether the backup control is necessary for the controlled object associated with the guest controller. If necessary, the processing proceeds to step 503 in which a program for the backup control is executed. If there exist two controllers to be backed up by that controller, the execution of the backup program is repeated until no controller remains for which the backup control is required and subsequently, the processing proceeds to step 504. In step 504, the response request signal is sent from the host controller to the guest controller to be monitored thereby, and presence or absence of the reply is judged in step 505. In the presence of the reply, the processing proceeds to step 507 in which control information data for the receiving guest controller is stored in a predetermined area of the RAM 18. Thus, the operation of this cycle is completed.

In the absence of the reply in step 505, sending of the response request signal is repeated by a predetermined number of times in step 506. If no reply condition still occurs even after the repeated sending of the response request signal, it is judged in step 508 that the guest controller is out of order, and the processing proceeds to step 509. Assuming that the program as illustrated is that for the controller $C_3$, the controller $C_2$ represents the guest controller. Then, in step 509, a flag is set indicating that the controlled object $H_2$ associated with the guest controller $C_2$ requires backup control. The judgement in step 502 depends on whether or not the flag is set. Thereafter, in step 510, the control program request signal is sent to the controller $C_1$ which is a new guest controller to be monitored by the controller $C_3$ in place of the controller $C_2$ now under fault. If no reply is received upon repeating the sending of the request signal a predetermined number of times, the system may be stopped. Upon receipt of the reply from the guest controller $C_1$, the control program for the controlled object $H_1$ is stored in a predetermined area of the RAM 18 included in the host controller $C_3$ and the operation of this cycle is completed.

In the previous embodiment, the transmission path may be made of a pair of twisted lines or a coaxial cable. Also, the switching unit may be made of a relay type switch or a semiconductor switch. The insulation between the signal transmission circuit, signal transmission module and transmission path may be accomplished by transformer coupling or photocoupler coupling. Alternatively, when the transmission path is made of optical fibers, a photo-switch may be used as the switching unit. In this case, the signal branching section requires a photo branch/coupler.

As has been described, according to the invention, the main tramsmission path is made up of a plurality of sections respectively corresponding to the controllers, and each controller normally controls the controlled object directly associated therewith and monitors a guest controller by using the corresponding transmission path section, so that in the event of failure of the guest controller, each controller performs backup control of the faulty guest controller and monitors another guest controller which has been monitored by the faulty guest controller by using the transmission path section corresponding to the faulty guest controller. Accordingly, without additional transmission paths for monitoring and backup control, it is possible to monitor and backup control any number of guest controllers by merely increasing the memory capacity for storage of necessary control information and data for the guest controllers. The processing speed is generally decreased with the backup control for the faulty controller unless the controller has sufficient capacity but in the system as a whole, continuous controlling of all the controlled objects can advantageously be accomplished.

Figure 6:
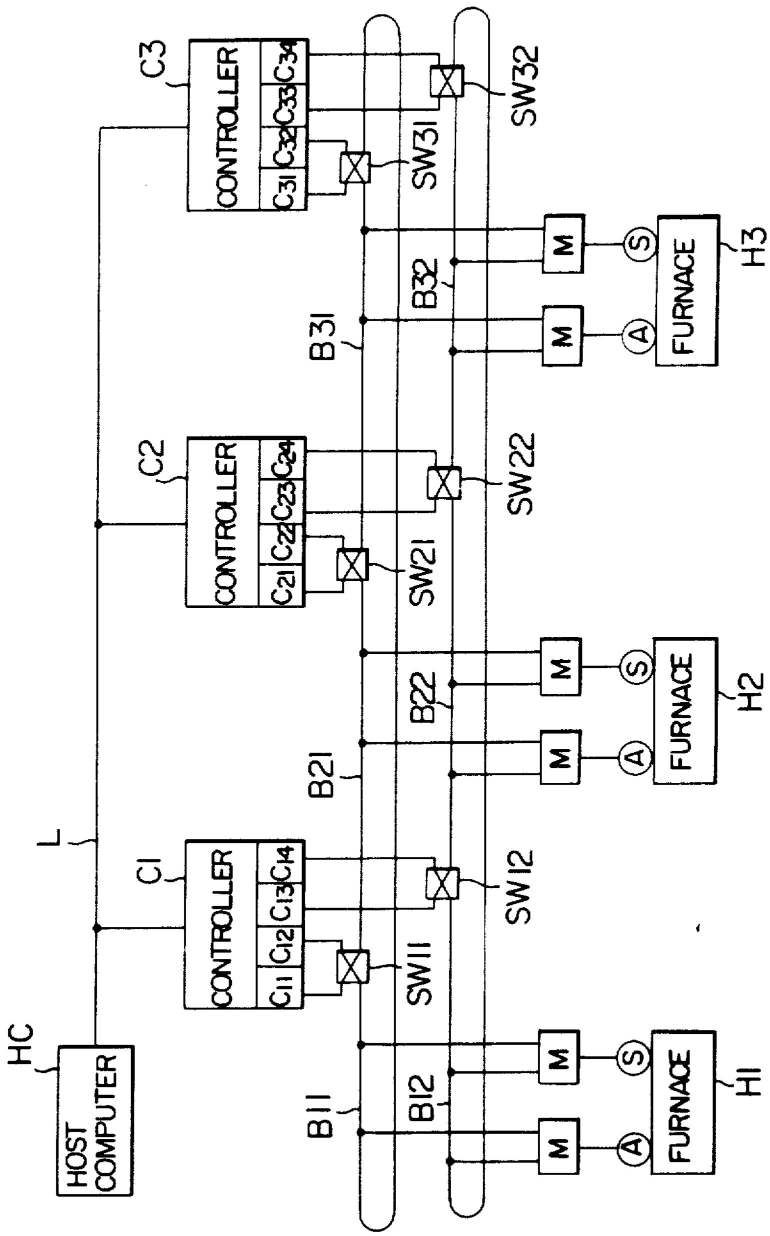
FIG. 6 is a block diagram showing a circuit arrangement of another embodiment of the invention.

FIG. 6 shows another embodiment of the invention.

If, in the previous embodiment of FIG. 1, the transmission path section $B_2$ on the left side of the switching unit $SW_2$, for example, is disconnected, the controller $C_2$ is unable to measure and control the sensor S and the actuator A. In the embodiment of FIG. 6, however, each of the controllers is equipped with additional transmitter/receivers $C_{13}$ and $C_{14}$, $C_{23}$ and $C_{24}$ or $C_{33}$ and $C_{34}$, additional switching unit $SW_{12}$, $SW_{22}$ or $SW_{32}$ and additional transmission path section $B_{12}$, $B_{22}$ or $B_{32}$ to double the transmission path and signal transmission circuit.

Figure 7:
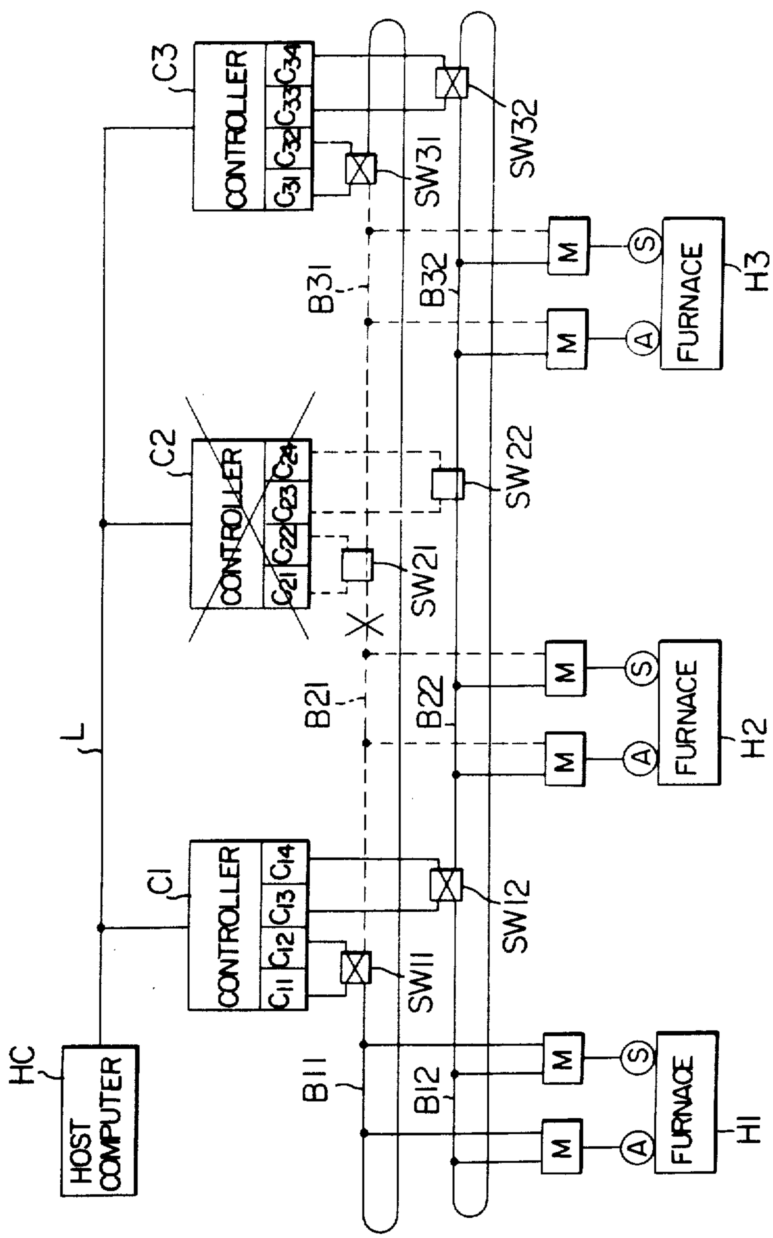
FIG. 7 is a block diagram useful in explaining the operation when fault occurs in one controller or at one location on the transmission path in the FIG. 6 embodiment.

When, in this embodiment, the controller $C_2$ subject to normal control, for example, sends a signal to the controller $C_1$ via the transmitter/receiver $C_{22}$ and the controller $C_1$ returns a reply to the controller $C_2$ via the transmitter/receiver $C_{13}$, the transmission path sections $B_{21}$ and $B_{22}$ can be monitored simultaneously each time the controller $C_2$ is monitored. FIG. 7 shows the status of the system when the controller $C_2$ and the transmission path section $B_{21}$ become out of order. In the event of such failure, the transmission path depicted by dotted lines is not used, and the controller $C_3$ measures and controls its own controlled object through the transmitter/receiver $C_{34}$ and monitors status of the controller $C_1$.

It should be understood that the number of controllers is not limited to three as in the foregoing embodiments but the present invention is applicable to a system having any number of controllers.

We claim:

1. A distributed control system for controlling a plurality of controlled objects, comprising:
   at least one transmission path divided into a plurality of sections to which said plurality of controlled objects are respectively connected;
   a plurality of controllers connected in cascade by the sections of said transmission path so that each controller is allocated to normally control an associated one of said controlled objects and to monitor the status of at least one of the other controllers normally connected thereto by one of said transmission path sections, each controller comprising:
   (a) first and second transmitter/receivers;
   (b) memory means having a capacity for storing data used for controlling at least two of said controlled objects;
   (c) switching means selectively operable in a first mode for connecting said first transmitter/receiver to one section of said transmission path to which the associated controlled object is connected and for connecting said second transmitter/receiver to a preceding section of said transmission path to which a preceding one of said controllers allocated to monitor the controller is connected or in a second mode for disconnecting said first and second transmitter/receivers from said one and preceding sections of said transmission path and for connecting said one and preceding sections to each other to bypass the controller on said transmission path;
   (d) switch control means for controlling said switching means to operate in said first mode when the controller is in a normal condition and in said second mode when the controller is in an abnormal condition; and
   (e) control means operating when said switching means operates in said first mode to transmit first data stored in said memory means through said first transmitter/receiver to the associated controlled object for controlling the same, to receive through said first transmitter/receiver second data to be stored in said memory means of a succeeding one of the controllers on said transmission path whose status is monitored by the controller, said second data including data which is used by said succeeding controller for controlling its associated controlled object and which is stored in the memory means of the controller for the purpose of controlling the succeeding controller's associated controlled object when said succeeding controller is judged to be abnormal, and to transmit said first data through said second transmitter/receiver to the first transmitter/receiver of the preceding controller.

2. A distributed control system according to claim 1 wherein said switch control means comprises means for generating pulses at a predetermined constant time interval when the controller normally operates, and means responsive to each of the pulses from the pulse generating means to hold said switching means in said first mode for a time longer than said predetermined constant time interval and to change said switching means to said second mode when a pulse has not been received by said pulse generating means for a time longer than said predetermined time constant interval.

3. A distributed control system according to claim 1 wherein said control means comprises means for sending through said first transmitter/receiver a signal which requests said succeeding controller to send information indicative of the status of said succeeding controller, and means for judging whether said succeeding controller is normal or abnormal from the presence or absence of a reply to the information request signal from said succeeding controller.

4. A distributed control system according to claim 1 further comprising:
   second transmission path divided into a plurality of sections to which said plurality of controlled objects are respectively connected;
   and wherein each controller further comprises:
   third and fourth transmitter/receivers;
   second switching means operating when the controller is under normal condition in a first mode for connecting said third transmitter/receiver to one section of said second transmission path to which the associated controlled object is connected and for connecting said fourth transmitter/receiver to a preceding section of said second transmission path to which a preceding one of the controllers allocated to monitor the controller is connected, and operating when the controller is in an abnormal condition in a second mode for disconnecting said third and fourth transmitter/receivers from said one and preceding sections of said second transmission path and for connecting said one and preceding sections to each other; and
   means for using the one section of said second transmission path in place of the one section of said first transmission path for controlling the associated control object when said one section of said first transmission path is rendered abnormal.

5. A distributed control system according to claim 1, wherein said second data includes further data which are used by a further succeeding controller for controlling its associated controlled object when said succeeding controller is under abnormal condition.

* * * * *